United States Patent [19]

Kovácsay et al.

[11] 4,232,136

[45] Nov. 4, 1980

[54] PROCESS FOR THE CONTROLLED HARDENING OF UNSATURATED POLYESTER RESINS

[75] Inventors: István Kovácsay; Mária Szajkó née Lórinczi; István Dubovszky; Lászlo Magdányi, all of Budapest; Ferenc Szailer, Budaors; Ede Szatmári, Budapest, all of Hungary

[73] Assignees: Muanyagipari Kutato Intezet; Finomvegyszer Szovetkezet, both of Budapest, Hungary; part interest to each

[21] Appl. No.: 15,736

[22] Filed: Feb. 27, 1979

[30] Foreign Application Priority Data

Jun. 3, 1978 [HU] Hungary .............................. MU 597

[51] Int. Cl.³ .................. C08F 18/00; C08F 118/14
[52] U.S. Cl. .................................. 525/327; 260/40 R; 526/319; 525/383; 528/272; 525/328; 525/329; 525/384
[58] Field of Search ................. 260/40 R; 526/14–16, 526/53, 57, 319; 528/272

[56] References Cited

U.S. PATENT DOCUMENTS

| | | | |
|---|---|---|---|
| 3,437,716 | 4/1969 | Leebrick | 528/272 |
| 3,766,111 | 10/1973 | Metzner et al. | 260/28 |
| 4,097,467 | 6/1978 | Roskott et al. | 528/272 |

OTHER PUBLICATIONS

Lubin, George, "Handbook of Fiberglass and Advanced Plastics Composites", Polymer Technology Series, p. 23.
"Encyclopedia of Polymer Science and Technology," vol. II, p. 129.

*Primary Examiner*—Lucille M. Phynes
*Attorney, Agent, or Firm*—Young & Thompson

[57] ABSTRACT

The invention relates to a process for the controlled hardening of unsaturated polyester resins at temperatures of −5° C. to +150° C. using an organic peroxide initiator. According to the process of the invention an organic dyestuff of the general formula (I),

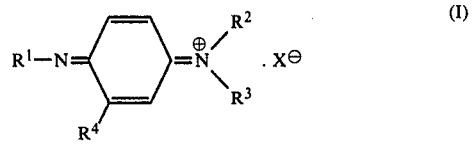

wherein
$R^1$ stands for a group of the general formula (II),

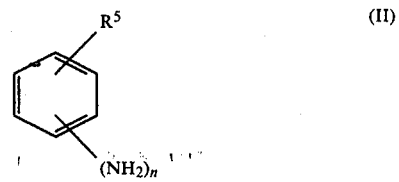

and in this formula $R^5$ is a $C_{1-4}$ alkyl group and n is an integer from 1 to 3,
$R^2$ and $R^3$ each represent a $C_{1-4}$ alkyl group,
$R^4$ stands for hydrogen, or
$R^1$ and $R^4$ form together a group of the general formula (III),

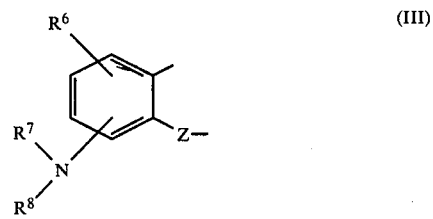

and in this formula $R^6$, $R^7$ and $R^8$ each represent hydrogen or a $C_{1-4}$ alkyl group and Z stands for oxygen or sulfur atom or a -NH- group, and
X stands for chlorine or bromine, is admixed with the polyester resin and/or the organic peroxide in an amount of 0.001 to 0.05% by weight, calculated for the weight of the polyester resin.

Using the method of the invention the composition and homogeneity of the polyester resin/additive mixtures can be observed easily and the progress of cross-linking can be monitored visually through characteristic colors and color changes, respectively.

4 Claims, No Drawings

PROCESS FOR THE CONTROLLED HARDENING OF UNSATURATED POLYESTER RESINS

This invention relates to a process for the controlled hardening of unsaturated polyester resins at temperatures of −5° C. to +150° C. using organic peroxide initiators.

As known, organic peroxides are utilized in the cross-linking of unsaturated polyester resins. These compounds decompose into radicals upon the effect of heat or accelerators and act as initiators to start copolymerization. During the progress of the copolymerization process the initially liquid polyester resin converts into a solid, insoluble substance. The use of colourless organic peroxides in these cross-linking processes has two disadvantages: it cannot be observed visually whether the initiator has been mixed with the polyester resin at all, and the progress of hardening cannot be visually controlled but only by mechanical hardness tests. The hardness observed allows conclusions to be drawn on the extent of cross-linking in the polyester product.

On objects with complicated shape and complex curved surfaces such tests can be performed, if at all, only at some parts. Therefore a method is required which enables one to draw conclusions on the extent of hardening also in such instances. The invention aims at the elaboration of a new method capable of solving this problem.

The invention is based on the recognition that certain organic dyestuffs can be utilized to advantage in controlling the hardening of unsaturated polyester resins. These substances, when admixed with the organic peroxide initiator or with the polyester resin itself, impart an intense colour to the resin-initiator mixture, but this colour disappears practically completely upon hardening, so that the hardened resin has the same colour as the resin which contains no colouring agent or was hardened with a colourless initiator.

Based on the above, the invention relates to a process for the controlled hardening of unsaturated polyester resins at temperatures of −5° C. to +150° C. using an organic peroxide initiator optionally along with an accelerator and/or promotor. According to the invention an orgnaic dyestuff of the general formula (I),

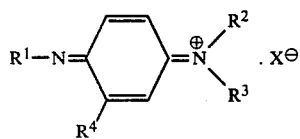

wherein
R$^1$ stands for a group of the general formula (II),

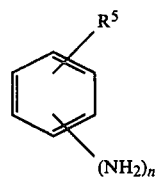

and in this formula R$^5$ is a C$_{1-4}$ alkyl group and n is an integer from 1 to 3,
R$^2$ and R$^3$ each represent a C$_{1-4}$ alkyl group,
R$^4$ stands for hydrogen, or R$^1$ and R$^4$ form together a group of the general formula (III) or (IV)

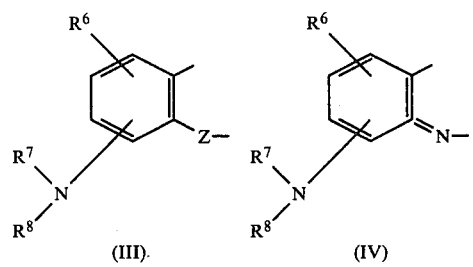

and in these formulae R$^6$, R$^7$ and R$^8$ each represent hydrogen or a C$_{1-4}$ alkyl group and Z stands for oxygen or sulfur atom or a —NH— group, and in formula IV R$^6$ may stand also for an amino group, and X stands for chlorine or bromine, is admixed with the polyester resin and/or the organic peroxide in an amount of 0.001 to 0.05% by weight, preferably 0.01 to 0.03% by weight, calculated for the weight of the polyester resin.

When polyester resins are hardened in the presence of organic dyestuffs having the general formula (I), the homogeneous distribution of the additive can be checked easily after mechanical or manual mixing, furthermore, the progress of hardening can be monitored by observing the colour change of the resin. This method enables an excellent control both in batchwise procedures (e.g. in the preparation of fibreglass-reinforced shaped polyester articles) and in continuous operations (production of plane or corrugated boards, profile drawing, etc.).

Of the compounds having the general formula (I) the following are the most preferred:
methylene blue (Colour Index No. 52015),
toluylene blue (Colour Index No. 49410),
brillantcresyl blue (Colour Index No. 51010),
neutral red (Colour Index No. 50040), and thionin (Colour Index No. 52000) dyestuffs.

The formulae of the above dyestuffs are as follows:

Methylene blue:

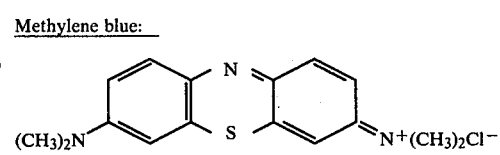

Toluylene blue:

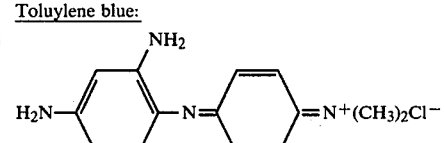

Brillantcresyl blue:

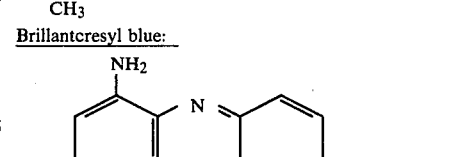

Neutral red:

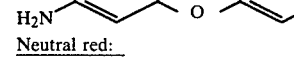

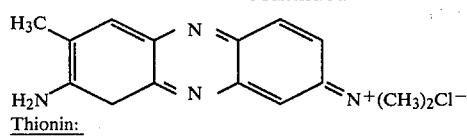
Thionin:

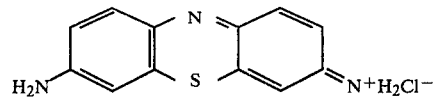

An important measure of all polyester production technologies is to form a completely homogeneous mixture from the resin and the additives (initiators, accelerators, promotors). When utilizing the compounds of the general formula (I) the homogeneity of the mixtures can be observed or checked very easily and advantageously. This is of particular importance primarily in the case of mechanical feeding, since the immediate change in the colour of the mixture, occurring e.g. upon operating disturbances, indicates the inappropriate composition on and the necessity of intervention.

The main advantages of the process of the invention are as follows:

(a) The composition and homogeneity of the mixtures of polyester resins and additives can be observed easily through characteristic colours and colour changes.

(b) The progress of cross-linking can be monitored visually, and the end of the reaction can be determined easily from the complete decolourization of the resin.

(c) When the required hardness, indicated by the colour change, is attained, the polyester resin can be removed safely from the mould, thereby shortening the production period and increasing the throughput of the equipment.

The process of the invention is elucidated in detail by the aid of the following non-limiting Examples.

EXAMPLE 1

20 g of cobalt naphthenate accelerator (cobalt content: 1%) are admixed with 2 kg of an unsaturated polyester resin. 0.1 g of methylene blue are admixed with 20 g of acetylacetone peroxide initiator, and the resulting solution is added to the resin. One third of the resulting mixture is applied with a brush to a glass sheet equipped with a shape separator, and the resin is distributed evenly on a surface of 1 m². A 1 m² fibreglass quilt with a specific gravity of 450 g/m² is placed onto the resin film, and the quilt is impregnated with half of the remaining resin mixture. Thereafter a second fibreglass quilt of the same specific gravity is placed onto the first, and the remainder of the resin is applied with a brush onto the quilt. The impregnated semi-finished product has an intense blue colour. In the cross-linking process of the resin gelling sets in 30 minutes after admixing, whereupon the colour starts to fade, and, when operating at 22° C., the resin becomes completely colourless 2 hours after admixing. This indicates that the hardening of the polyester is complete, and thus the fibreglass-reinforced polyester sheet can be removed from the glass sheet.

EXAMPLE 2

This example relates to the production of fibreglass-reinforced corrugated boards. A polyester resin is fed by an injector pump onto a cellophane foil, drawn continuously by the machine, in an amount sufficient to impregnate the fibreglass quilt forwarded in the next step continuously by the same machine. 10 g of cobalt naphthenate accelerator, furthermore a mixture of 5 g of tert.-butyl peroctoate, 2.5 g of cyclohexanone peroxide, 2.5 g of triethyl phosphate and 0.05 g of brillantcresyl blue, each calculated for 1 kg of the resin, are added to the resin by the injector pump. When passing the impregnating stage of the machine the fibreglass quilt is impregnated with the liquid resin and becomes vivid blue.

The machine forwards the impregnated quilt between cellophane foils to the hardening stage, where the resin is cross-linked at 80° C. If cross-linking proceeds to the required extent, the final board leaving the hardening stage is completely colourless. Thereby the quality of the board obtained in the hardening stage can be controlled continuously.

EXAMPLE 3

One proceeds as described in Example 1 with the only difference that toluylene blue is substituted for methylene blue. The mixture is blue before cross-linking starts and becomes colourless after cross-linking.

EXAMPLE 4

One proceeds as described in Example 2 with the only difference that neutral red is substituted for brillantcresyl blue. The mixture is deep red before cross-linking starts and becomes colourless after cross-linking.

What we claim is:

1. A process for the controlled hardening of unsaturated polyester resins at temperatures of $-5°$ C. to $+150°$ C. using an organic peroxide initiator optionally along with an accelerator and/or promotor, characterized in that an organic dyestuff of the formula

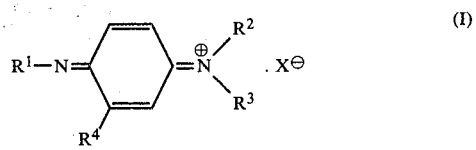

wherein $R^1$ stands for a group of the formula

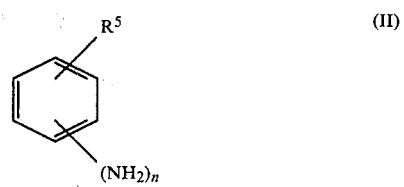

and in this formula $R^5$ is $C_{1-4}$ alkyl and n is an integer from 1 to 3, $R^2$ and $R^3$ each represent $C_{1-4}$ alkyl, $R^4$ stands for hydrogen, or $R^1$ and $R^4$ form together a group of the formula

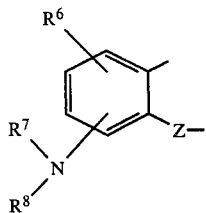

and in this formula $R^6$, $R^7$ and $R^8$ each represent hydrogen or $C_{1-4}$ alkyl and Z stands for oxygen or sulfur or —NH—, and X stands for chlorine or bromine, is admixed with a said polyester resin and/or said organic peroxide in an amount of 0.001 to 0.05% by weight, calculated on the weight of the polyester resin.

2. A process as claimed in claim 1, characterized in that the organic dyestuff of the formula (I) is used in an amount of 0.01 to 0.03% by weight calculated on the weight of the polyester resin.

3. A process as claimed in claim 1 or 2, characterized in that methylene blue, toluylene blue, brillantcresyl blue or neutral red is as as organic dyestuff of the formula (I).

4. A hardened polyester resin prepared according to the method of claim 1.

* * * * *